May 15, 1928. 1,670,039
B. F. LEWIS
CRAB TRAP
Filed Sept. 21, 1927
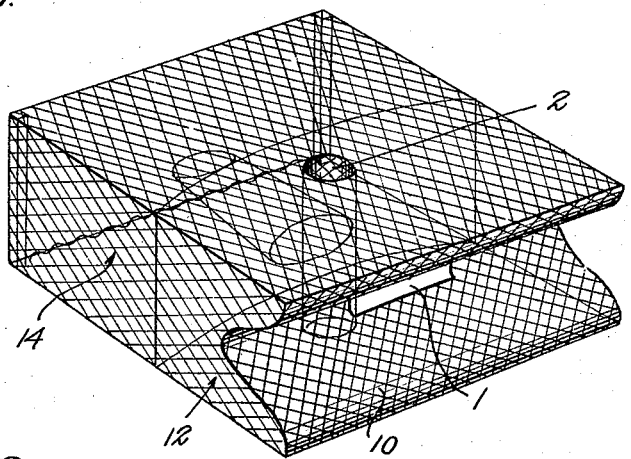
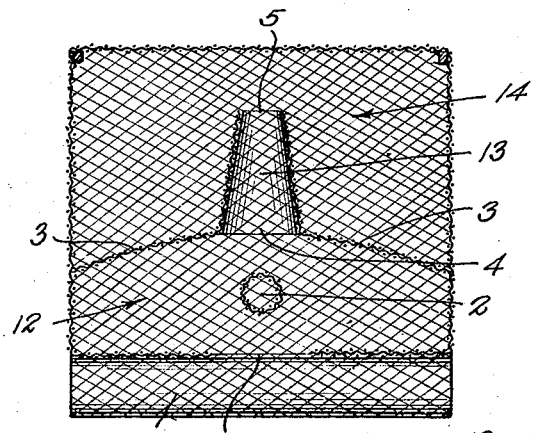
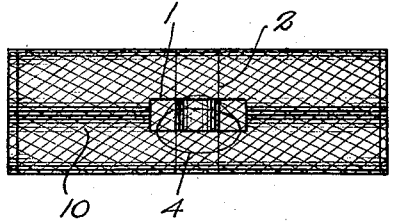
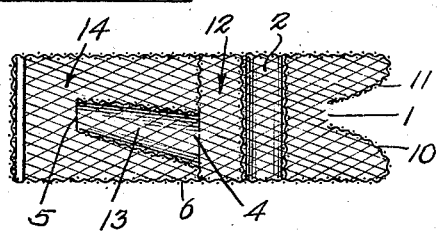
Inventor
BENJAMINE F. LEWIS.
By Munson H. Lane
Attorney Patented May 15, 1928.

1,670,039

UNITED STATES PATENT OFFICE.

BENJAMINE F. LEWIS, OF HARRYHOGAN, VIRGINIA, ASSIGNOR TO HARVEY T. LEWIS, OF HARRYHOGAN, VIRGINIA.

CRAB TRAP.

Application filed September 21, 1927. Serial No. 220,968.

The invention relates to an improvement in traps and more particularly to a trap designed for catching crabs.

So far as I am aware no trap has ever been designed hitherto which will successfully catch crabs. The ordinary fish trap is entirely inapplicable to this purpose on account of the difference in habits and in shape, between the fish and the crab. Furthermore, lobster traps as hitherto designed, are not suitable for catching crabs, the lobsters being long and relatively narrow in form, while the crab is wide and flat, and moreover the habits of the two crustaceans are different in many respects.

The present device has been designed for the express purpose of catching crabs and is the result of close observations and repeated experiment in the desgin of the trap.

A preferred embodiment of the invention is disclosed in the accompanying drawings in which:—

Fig. 1 is a perspective view showing the trap as a whole.

Fig. 2 is a central horizontal plan section showing various chambers and passageways leading into and through the trap.

Fig. 3 is a vertical transverse section on line 3—3 of Fig. 2.

Fig. 4 is a vertical longitudinal section on line 4—4 of Fig. 2.

The crab trap as a whole is preferably rectangular in shape, and in practice is three feet long, three wide and one foot high and is constructed of one inch diamond mesh galvanized wire.

The front of the trap at 10 slopes gradually upward and inward from the bottom to about midway the height of the trap and likewise a similar portion 11 slopes inwardly and downwardly from the top. Along the meeting edges of these sloping portions and about midway in width, a door 1 is provided through which the crabs enter into the chamber 12, being attracted by the bait in the cup 2. The door 1 is located about one foot to the rear of the front edges of the trap and is about eight inches long and one and one-half inches high, allowing ample space for the largest crabs to enter without touching the sides of the entrance, but being too small to provide an easy exit from the chamber 12. The sloping floor portion 10 provides an easy means of approach for the crab, which enters the trap by walking rather than by swimming.

The cup 2 for the bait is preferably made of the same material as the trap, and is cylindrical in form, an opening to the cup being made preferably by severing one or more meshes immediately over the top of the cup.

The cup is placed in front of the opening or door 1 of the trap, directly in view of the crab, is about four inches in diameter, and extends from the top to the bottom of the trap. The front of the cup is preferably reinforced with additional diamond mesh wire to prevent the crab from pulling the bait from the same. A bait cup of this character provides a permanent attraction to an indefinite number of crabs, and the bait does not have to be replenished.

The primary receiving chamber 12 is provided with a rear upright wall or partition 3 which is somewhat concave from the direction of the chamber 12, and converges slightly toward a door 4 opening into a passage 13 and thence through door 5 to the secondary receiving chamber 14.

The door 4 is close to the bottom of the trap and is quite large, about eight inches in diameter, so that it is readily entered by a crab from the primary chamber 12. The crab will be forced from the chamber 12 by other crabs coming in through the door 1, the new comers immediately driving the others out of the primary chamber 12 into the secondary chamber 14. This action has been repeatedly observed, and is one of the important reasons for the successful operation of the present device.

The passageway 13 is about one foot long and leads to a point near the rear of the trap. The exit door 5 is much higher and smaller than the door 4 and is flattened on the inside to about one and one half inches in height. This door forms a non-return entrance, through which the crabs are unable to pass in the reverse direction from chamber 14 to chamber 12.

The trap may be constructed comparatively cheaply, but must be made to withstand hard wear. The walls of the trap are preferably laced together with heavy twine, and being strengthened by upright posts at each corner of the trap, these posts being about one half inch in diameter.

The bottom floor of the trap at the right hand corner preferably forms the door from which the crabs are removed, this door (not shown) being laced or fastened with strong twine or spring staples.

The trap may be lifted by means of a rope fastened at the right side of the front of the trap, the other end of the rope being fastened to a stake or buoy. The weight of the trap is found to be sufficient to prevent drifting.

The trap should be baited once each day, the bait being placed in the cup 2 for this purpose, but the trap should be tended or fished two or more times a day, the crabs being taken from the door of the trap as above described.

It will be understood that the invention is not limited to the precise details shown and described, and that the dimensions set forth are merely for the purpose of illustrating one particular embodiment of the invention which has been satisfactorily used.

What I claim is:—

1. A crab trap composed of reticulated fabric, having at its front end sloping portions extending gradually inwardly from top and bottom, an unobstructed entrance, relatively wide as compared to height, located on the meeting line of said sloping portions, said trap having a primary receiving chamber, a bait cup in said primary receiving chamber and extending from top to bottom of said trap directly in front of said entrance, a secondary chamber located in rear of said primary chamber, and separated therefrom by a concavo-convex wall, and a non-return passage leading from said primary to said secondary chamber.

2. A crab trap composed of reticulated fabric, having at its front end sloping portions extending gradually inwardly from top and bottom, an unobstructed entrance, relatively wide as compared to height located on the meeting line of said sloping portions, said trap having a primary receiving chamber, a bait cup in said primary receiving chamber and extending from top to bottom of said trap directly in front of said entrance, a secondary chamber located in rear of said primary chamber, and separated therefrom by a wall, and a non-return passage leading from said primary to said secondary chamber.

In testimony whereof I affix my signature.

BENJAMINE F. LEWIS.